Oct. 20, 1942.                W. L. McGRATH                2,299,335
                          AIR CONDITIONING SYSTEM
                           Filed June 25, 1938              3 Sheets-Sheet 1

Inventor
William L. McGrath
By
George H. Fisher
Attorney

Inventor
William L. McGrath
By George H Fisher
Attorney

Oct. 20, 1942.  W. L. McGRATH  2,299,335
AIR CONDITIONING SYSTEM
Filed June 25, 1938  3 Sheets-Sheet 3

Inventor
William L. McGrath
By George H Fisher
Attorney

UNITED STATES PATENT OFFICE 2,299,335

AIR CONDITIONING SYSTEM

William L. McGrath, St. Paul, Minn., assignor to Minneapolis-Honeywell Regulator Company, Minneapolis, Minn., a corporation of Delaware Application June 25, 1938, Serial No. 215,796

9 Claims. (Cl. 62—6)

This invention relates to an air conditioning system and more particularly to a system for controlling the temperature of a fluid used for cooling purposes.

In many air conditioning systems, well water is used for colling the temperature of air being circulated through a space to be conditioned and it is common practice to turn on the supply of well water when cooling is required and when the temperature of the space has fallen to the predetermined value, the supply of well water is shut off. If the air being circulated over the coil through which the well water flows is not much warmer than the temperature to which it is desired to lower the space, the well water leaving the coil will not have been warmed up to a very high value and if this well water after flowing through the cooling coil is thrown away as is common practice, much of the cooling value of this water will have been wasted.

In accordance with my invention I propose to control the flow of water through the coil in such a way that there will be a sufficient temperature rise of the water leaving the coil to insure that the water is being used to obtain the greatest cooling effect thereof. I accordingly make use of a differential temperature controller which is responsive to the temperature of the water entering the coil and the water leaving the coil to position the valve which controls the flow of water through the coil in such a way so as to insure a predetermined temperature rise of the water flowing through the coil. The amount of differential which is maintained between the inlet and exit of the coil may be varied in accordance with the cooling requirements of the space. In other words, if the temperature of the space is at a very high value then the differential in temperature between the inlet and exit of the coil may be somewhat less than if the temperature in the space is at a lower value, in order that the temperature within the space may be reduced in a shorter time than would be possible if a high temperature differential between the inlet and the outlet of the coil were maintained at all times. In this way I am able to efficiently utilize the well water for cooling purposes while at the same time effectively controlling the temperature within the space being cooled.

This same system may be utilized in other systems such as in refrigeration systems wherein well water is utilized to cool the condenser of the refrigeration system.

It is therefore an object of my invention to suitably control the flow of cooling fluid through a cooling coil so as to utilize the cooling capacity of the fluid at high efficiency.

More particularly it is an object of my invention to control the flow of well water through a cooling coil so as to maintain a predetermined temperature differential between the inlet and outlet of the coil for any particular temperature within the space being conditioned.

A further object of my invention is to provide means for controlling the flow of cooling water through a condenser of a refrigeration system by maintaining a predetermined temperature differential between the inlet and outlet of the condenser cooling water, which differential may be compensated by the pressure on the high pressure side of the refrigeration system.

A further object of my invention is the provision of a novel temperature differential controller for controlling the flow of a cooling fluid through a coil so as to maintain a predetermined temperature differential between the inlet and outlet of the coil.

Further objects and advantages will become apparent upon reference to the accompanying specification, claims and appended drawings wherein like reference characters represent like parts in the various views, and in which:

Figure 1:
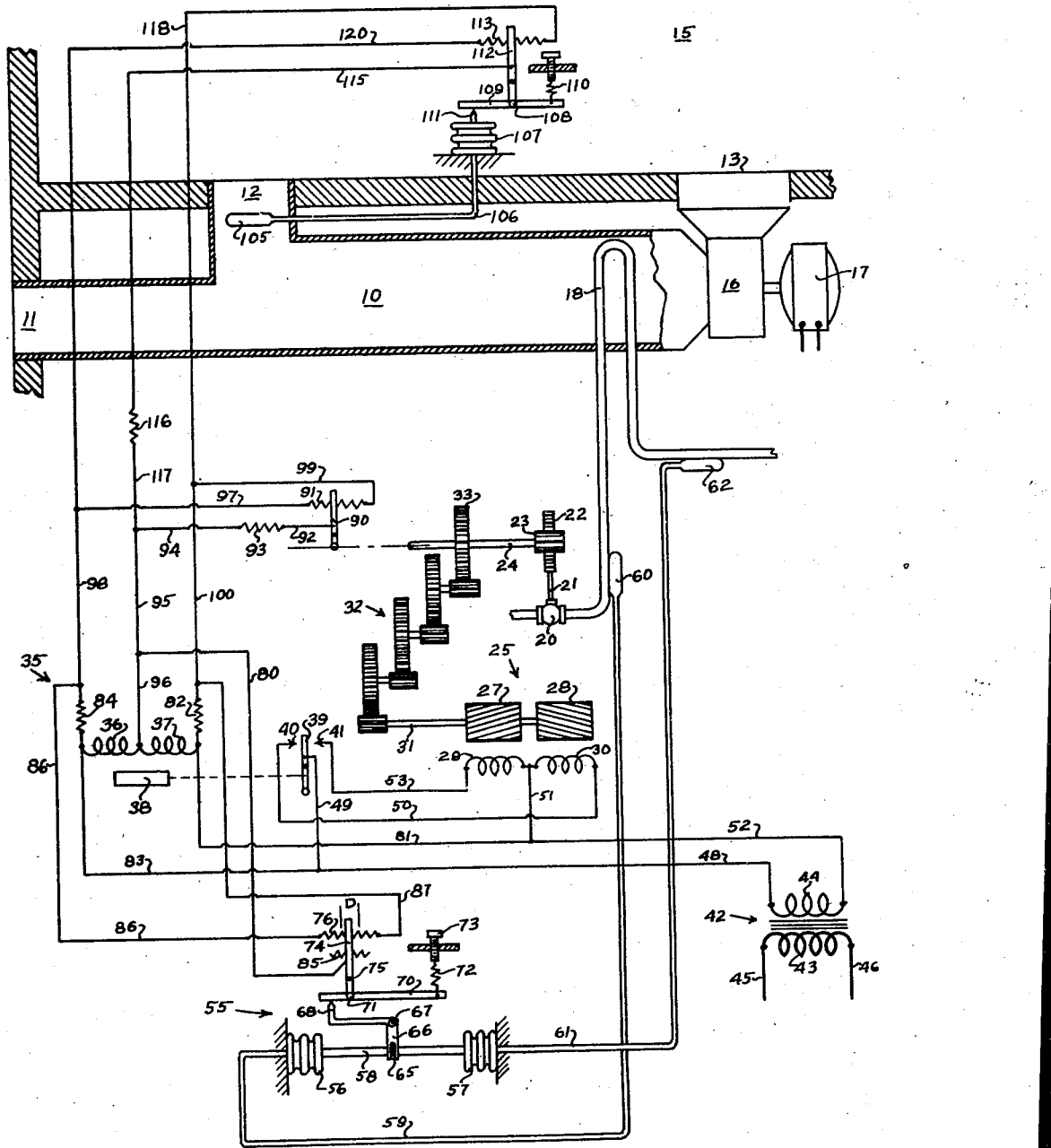
Figure 1 is a diagrammatic view of one form of system embodying my invention.

Referring now to Figure 1, an air conditioning chamber is represented generally by the reference character 10, this chamber including a fresh air inlet 11, a return air inlet 12, and an outlet 13 communicating with a space 15 to be conditioned. A fan 16 driven by a motor 17 is provided for drawing air through the chamber 10 and exhausting it into the space 15. Mounted within the chamber 10 is a cooling coil 18 over which the air being circulated through the chamber 10 passes and through which a suitable cooling medium such as well water flows.

The flow of water through the coil 18 may be controlled by a valve 20. Valve 20 includes a valve stem 21 having a rack 22 rigidly mounted on the upper end thereof and meshing with a pinion 23 carried by a shaft 24. A motor generally indicated by the reference character 25 is provided for operating the shaft 24, and this motor may be a proportioning motor of the type illustrated in Patent 2,028,110 issued Jan. 14, 1936, to D. G. Taylor. This motor may include a pair of armatures 27 and 28 which are selectively energized by the field windings 29 and 30. Armatures 27 and 28 may be carried by a shaft 31 which is connected by means of suitable reduction gearing 32 to a gear 33 carried on the shaft 24. Upon energization of the field winding 29, the armature 27 rotates in a direction to cause the valve 20 to be moved towards closed position, and upon energization of the field winding 30 the armature 28 is rotated to cause valve 20 to be moved towards open position.

The energization of field windings 29 and 30 is controlled by a relay generally designated by the reference character 35. Relay 35 may include a pair of opposed balanced relay coils 36 and 37 suitably connected together at one end thereof, and an armature 38 connected to a switch arm 39 which cooperates with fixed contacts 40 and 41. When coils 36 and 37 are equally energized they exert an equal force on the armature 38 and this armature remains in a mid position illustrated causing switch arm 39 to remain midway between contacts 40 and 41. When relay coil 36 becomes more highly energized than coil 37 the armature 38 is attracted toward the left and causes movement of arm 39 into engagement with the contact 40. When the relay coil 37 becomes more highly energized than the coil 36 the armature 38 is attracted to the right and causes arm 39 to move into engagement with the contact 41.

For supplying power to the motor 25 and the relay 35 a step-down transformer 42 having a high tension primary 43 and a low tension secondary 44 may be provided. The primary 43 may be connected to line wires 45 and 46 which are connected to a suitable source of power, (not illustrated). When the arm 39 is moved into engagement with the contact 40 by reason of the relay coil 36 becoming more highly energized than relay coil 37, field winding 30 of motor 25 is energized by means of the following circuit: from the secondary 44 through conductors 48, 49, arm 39, contact 40, conductor 50, field winding 30, and conductors 51 and 52 to the other side of secondary 44. On the other hand when the arm 39 is moved into engagement with the contact 41 by reason of relay coil 37 becoming more highly energized than coil 36, field winding 29 of the motor 25 is energized through the following circuit: from the transformer secondary 44 through conductors 48, 49, arm 39, contact 41, conductor 53, field winding 29, and conductors 51 and 52 to the other side of secondary 44. It will now be apparent that when the relay coil 36 is more highly energized than coil 37, field winding 30 of motor 25 is energized and the valve 20 is moved towards open position. Likewise when coil 37 becomes more highly energized than coil 36 field winding 29 is energized causing the motor to move the valve 20 towards closed position.

The energization of the relay coils 36 and 37 is controlled primarily by a differential pressure controller represented generally by the reference character 55. This controller may include a pair of bellows 56 and 57 connected together by a rigid bar 58. Bellows 56 is connected by means of a capillary tube 59 to a bulb 60 mounted in intimate contact with the inlet of the cooling coil 18. The bellows 57 is connected by means of a capillary tube 61 to a bulb 62 which is mounted in intimate contact with the outlet of the cooling coil 18. Both of the bellows, tubes, and bulb may be provided with a suitable volatile fill so that upon a temperature change at either the inlet or outlet of the coil 18 the bellows 56 or the bellows 57 will tend to expand or contract depending upon the change in temperature at the inlet or outlet of the coil. The position of rod 58 will depend upon both the bellows 56 and 57 and since bellows 56 responds to the temperature on the inlet side of the coil 18 and bellows 57 responds to the temperature at the outlet side of the coil the position of the rod 58 will depend upon the differential in temperature between the inlet and outlet of the coil 18. Thus if the temperature differential should decrease by reason of a drop in temperature at the outlet of the coil 18 or by reason of a rise in temperature at the inlet of the coil the rod 58 will be caused to move to the right. On the other hand if the temperature differential increases rod 58 will be moved toward the left.

Carried by the rod 58 is a pin 65 received by the bifurcated end 66 of the bell crank lever 67. The opposite end 68 of this lever engages one end of a second lever 70 pivoted at 71. This end of the lever 70 is biased by means of a spring 72 at the opposite end of the lever connected to an adjusting screw 73 into engagement with the end 68 of the lever 67. Rigidly connected to the lever 70 is an arm 74 suitably insulated at 75 from the lever 70. Arm 74 is arranged to sweep across a resistance 76, this arm 74 and resistance 76 forming a control potentiometer for the relay 35. As the rod 58 moves to the left by reason of an increase in the temperature differential between the inlet and outlet of the coil 18, the lever 67 is caused to rotate in a clockwise direction which in turn causes the arm 74 to move to the right as is apparent from the drawings. Conversely upon a drop in the temperature differential between the inlet and outlet of the coil 18 the arm 74 is caused to move toward the left over resistance 76.

The junction of relay coils 36 and 37 is connected by means of conductors 96 and 80 and a center tapped resistance 85 to the arm 74. The opposite end of coil 37 is connected by means of conductors 52 and 81 and the protective resistance 82 to one side of the secondary 44 of transformer 42. The other side of this secondary is connected by means of conductors 48 and 83 and the protective resistance 84 to the other side of the relay coil 36. The left end of relay coil 36 is also connected by means of protective resistance 84 and the conductor 86 to the left end of resistance 76. The opposite end of this resistance is connected by means of conductor 87 and protective resistance 82 to the right end of the relay coil 37.

With the arm 74 in the mid position as illustrated it will be apparent that coils 36 and 37 will be equally energized. Should the arm 74 be moved towards the right by reason of an increase in temperature differential through the coil 18, the resistance in series with the relay coil 36 will be decreased whereas resistance in series with coil 37 will be increased. Coil 36 will therefore be more highly energized than coil 37 and armature 38 will be attracted toward the left thus energizing the field winding 30 causing opening movement of the valve 20. On the other hand should the arm 74 be moved towards the left by reason of a decrease in the temperature differential, the resistance in series with coil 37 will become less than that in series with the coil 36 and field winding 29 of motor 25 will be energized thus causing closing movement of the valve 20. It will now be seen that upon an increase in temperature differential across the coil 18, the valve 20 is opened to increase the flow of water to the coil whereas if the temperature differential across the coil decreases, the valve 20 is moved towards closed position to decrease the supply of water to the coil 18.

Operated by the motor 25 is an arm 90 mounted on the shaft 24 and being arranged to sweep across resistance 91 as the motor operates, this arm and resistance forming a balancing potentiometer for the relay 35. The arm 90 is connected by means of conductors 92, a resistance 93, and conductors 94, 95, and 96 to the junction of the relay coils 36 and 37. The left end of resistance 91 is connected by means of conductors 97, 98, and protective resistance 84 to the left end of coil 36. The opposite end of resistance 91 is connected by means of resistance 99, conductor 100, and protective resistance 82 to the right end of the coil 37. It will now be seen that this potentiometer is connected in parallel with the relay coils 36 and 37 and the potentiometer formed by resistance 76 and arm 74. The arm 90 is moved in an opposite sense to the arm 74 upon rotation of the motor 25 to counteract the effect of movement of arm 74. In other words, if upon an increase in differential across the coil 18 the arm 74 moves to the right causing energization of field winding 30 and the opening of valve 20. Upon rotation of the motor 25 the arm 90 is moved towards the left and when this arm has moved sufficiently far so as to cause a rebalancing of the relay coils 36 and 37 the armature 38 will move back to mid position thus interrupting the operation of the motor 25. By reason of the provision of resistance element 93 in the circuit to arm 90, this arm must move over a relatively large distance to counteract the effect of a smaller movement of the arm 74. In other words, a movement of arm 74 through the distance D may be sufficient to cause movement of the valve 20 from closed to wide open positions and in order to rebalance the coils 36 and 37 the arm 90 will have to move through a much greater distance such as from one end of the resistance 91 to the other.

Mounted in the return air inlet 12 is a bulb 105 connected by means of a capillary tube 106 to a bellows 107, this tube, bulb, and bellows being filled with a suitable volatile fluid. Pivoted at 108 is a lever 109 having one end held by means of an adjustable spring 110 against a pin 111 or other suitable member connected to the upper portion of the bellows 107. Rigid with the lever 109 and suitably insulated therefrom is an arm 112 arranged to sweep over resistance 113, this arm and resistance forming a compensating potentiometer for the relay 35. The arm 112 is connected to the junction of coils 36 and 37 by means of conductors 115, resistance 116, and conductors 117, 95, and 96. The right end of the resistance 113 is connected by means of conductors 118, 100, and resistance 82 to the right end of coil 37. The opposite end of the resistance 113 is connected by means of conductors 120, 98, and resistance 84 to the left end of coil 36. Upon an increase in temperature of the air entering the return air inlet 12, the bellows 107 expands and causes arm 112 to move toward the right which has the effect of decreasing the resistance in series with the coil 36 and increasing the resistance in series with the coil 37 thus causing the motor 25 to impart an opening movement to the valve 20. Since the resistance 116 is in the circuit to the control arm 112, this control arm will be less sensitive than the control arm 74 of the control potentiometer. A movement of the arm 112 has the effect therefore of shifting the control range D of the arm 74, a movement of the arm 112 to the right in response to an increase in the return air temperature having the effect of shifting the control range D of arm 74 to the left so as to maintain a smaller differential in temperature across the coil 18. On the other hand if the return air temperature drops, causing arm 112 to move toward the left over resistance 113, relay coil 37 becomes more highly energized than coil 36 and motor 25 operates to close the valve 20 and the control range of the arm 74 is moved towards the right to maintain a higher temperature differential across the coil 18. The provision of the center tapped resistance 85 insures that the control range D will have the same length regardless of the position of this control range over resistance 76.

It will now be seen that in the form of invention shown in Figure 1, for any given temperature in the space 15, the valve 20 will operate to maintain a predetermined temperature differential across the coil 18 so that the water being circulated therethrough is used most effectively. If however the temperature within the space 15 increases, this increase being reflected by the bulb 105 and bellows 107, a greater need for cooling is indicated and valve 20 is then operated to maintain a lower temperature differential across the coil 18, the control range of the controller 74 being shifted towards the left. On the other hand upon a drop in temperature in the space 15 a smaller need for cooling is indicated and a higher differential of temperature is maintained across the coil 18, the control range of the arm 74 now being shifted towards the right over resistance 76. It should be understood that resistances 93 and 116 may be variable resistances in order that the operating characteristics of the system may be controlled.

Figure 2:
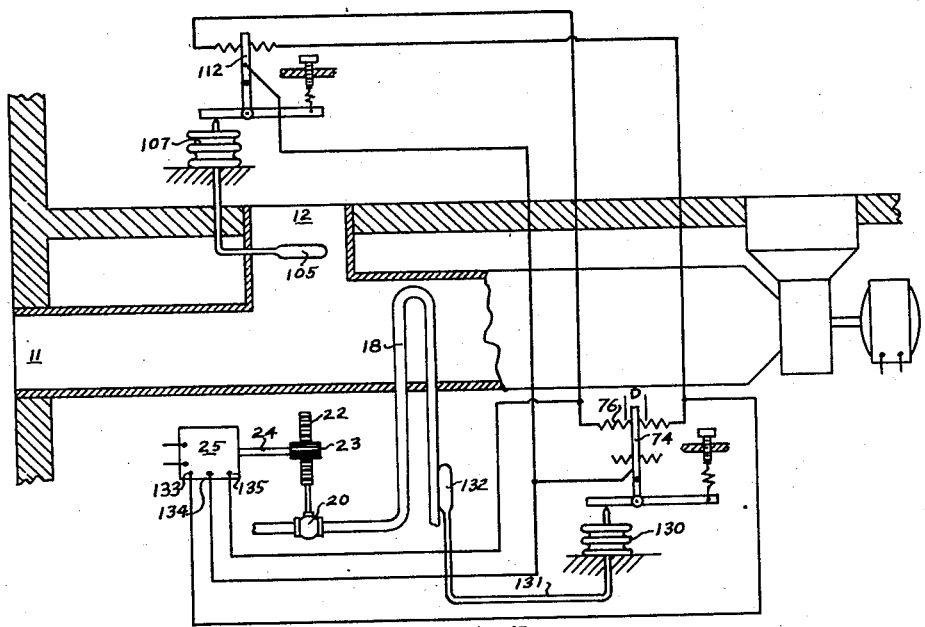
Figure 2 is a modification of the system shown in Figure 1 wherein the water flowing to the cooling coil has a uniform inlet temperature.

Referring now to the form of invention shown in Figure 2, the water flowing through the coil 18 is assumed to have a uniform inlet temperature so that the valve 20 need be controlled only in accordance with the temperature of the water leaving the coil 18 in order to obtain the same results as obtained in Figure 1. The motor 25 for operating the valve is not shown in detail in this figure but it will be understood that this motor may include two pairs of armatures and field windings, the opposed balanced relay coils and the balancing potentiometer, all as described in connection with Figure 1. The control potentiometer 73 is connected to the motor 25 in the same manner as in Figure 1 and the arm 74 of this potentiometer is operated by a single bellows 130, this bellows being connected by means of a capillary tube 131 to the bulb 132 mounted in the intimate contact with the outlet of the coil 18. As the temperature of the water leaving the coil 18 increases, the arm 74 will be urged by the bellows 130 toward the right thus decreasing the resistance between the terminals 133 and 134 of the motor whereupon the motor operates to move the valve towards open position an amount proportional to the amount of movement of the arm 74 over the resistance 76. If the temperature at 132 drops, indicating the water is being supplied to the coil 18 faster than is necessary for cooling purposes, arm 74 is moved toward the right, the resistance between the terminals 134 and 135 is decreased and the motor causes the valve 20 to be moved towards closed position. The action of the control arm 74 is compensated by the control arm 112 which moves in response to variations in return air temperature in the same manner as disclosed in connection with Figure 1.

It will now be apparent that the system of Figure 2 is substantially the same as in Figure 1 except that the arm 74 moves in accordance with variations in temperature at the outlet of the coil 18 instead of moving in accordance with variations in temperature differential across the coil as in Figure 1. This arrangement is entirely satisfactory where the temperature of the water entering the coil is substantially the same at all times since the bulb 132 will in such a case be actually indicating variations in temperature differential between the inlet and the outlet of the coil as in Figure 1.

Figure 3:
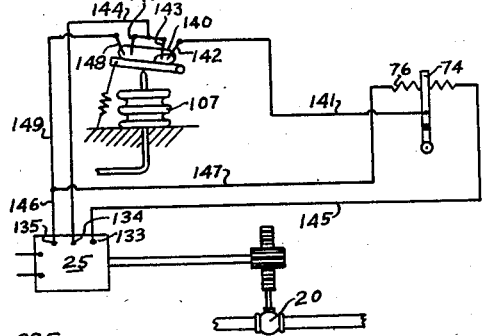
Figure 3 is a modification of a portion of Figure 2 showing a slightly different control arrangement.

Referring now to Figure 3 the bellows 107 which expands and contracts in accordance with variations in return air temperature operates a mercury switch 140 instead of the potentiometer arm 112 as in Figures 1 and 2. The control arm 74 of the control potentiometer is connected to the junction 134 of the relay coils by means of conductors 141, terminals 142 and 143 of the switch 140 and conductor 144. The terminal 133 is connected by means of conductor 145 to the right end of resistance 74 and the terminal 135 is connected by means of conductors 146 and 147 to the left end of the resistance 76. When the mercury switch is in the position illustrated, the valve 20 will be operated by the motor 25 to increase or decrease the supply of water to the coil 18 in the same manner as in Figures 1 and 2. However, when the return air temperature drops to a predetermined low value, the mercury switch 142 will be tilted in the opposite direction whereupon terminals 134 and 135 of the motor 25 will be directly connected together as follows: from terminal 134 through conductor 144, terminals 147, 148 of the switch 140 and conductors 149 and 146 to the terminal 135. When these terminals are directly connected together the motor 25 will operate to entirely close the valve 20 and prevent the supply of water to the coil 18, the arm 74 of the control potentiometer having no effect whatever on the motor 25.

It will therefore be seen that with the system illustrated in Figure 3, which may be applied either to the systems of Figure 1 or 2, that when there is a call for cooling within the space the mercury switch 140 will be tilted to the position wherein the terminals 142 and 143 are connected together and the potentiometer arm 74 will be in control of the valve 20 to control the supply of water to the coil 18 to maintain a predetermined temperature differential across the coil. However when the temperature within the space drops to a low enough value indicating that there is no necessity for further cooling of the space the mercury switch 140 will be tilted to connect the contacts 147 and 148 and cause motor 25 to run to a position wherein the valve 20 is entirely closed thus preventing the supply of water to the coil 18. As soon as the temperature again rises above the desired value the valve 20 will be controlled by the potentiometer arm 74.

Figure 4:
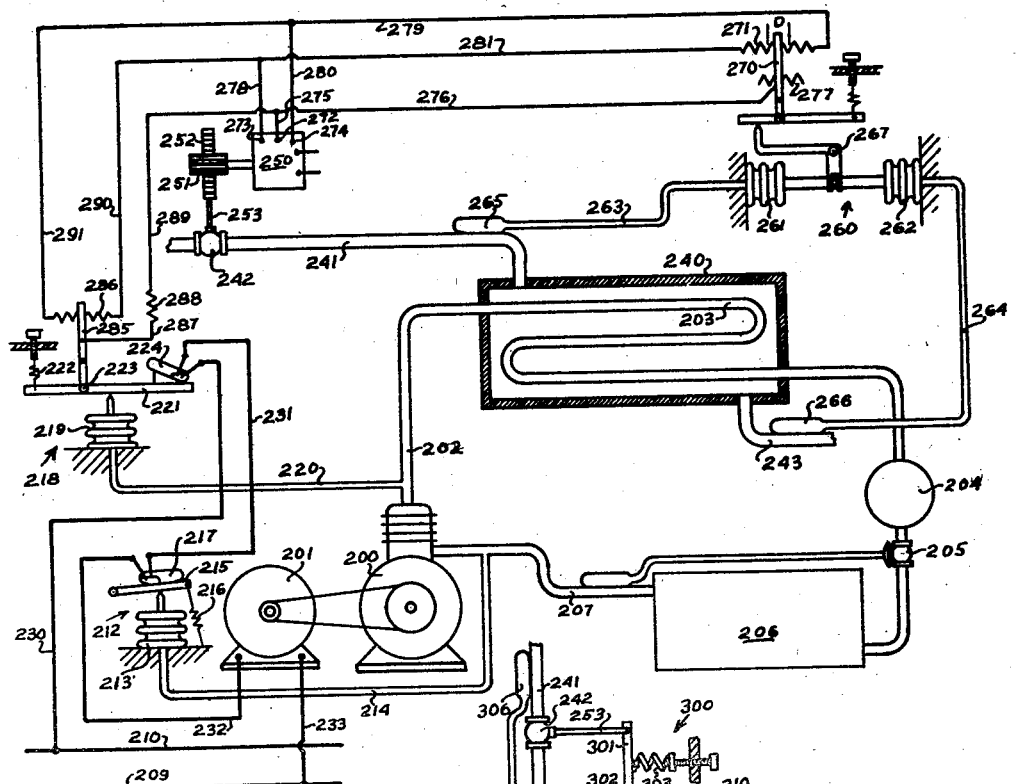
Figure 4 is a view of my invention as applied to the condenser of a refrigeration system.

Referring now to Figure 4, my invention is illustrated in connection with a refrigeration system for controlling the supply of cooling water to the condenser thereof. This system may include a compressor 200 driven by a motor 201, the outlet of the compressor being connected by a pipe 202 to the condenser coil 203, the outlet of the condenser being connected to a receiver 204, there being a thermostatic expansion valve 205 for controlling the flow of refrigerant from the receiver 204 to the evaporator 206. Refrigerant flows from the evaporator 206 through a pipe 207 to the inlet of the compressor 200. The operation of such a system will be apparent to those skilled in the art. Lines 209 and 210 which may be connected to a suitable source of power (not shown) are provided for supplying power to the motor 201. For controlling the operation of the compressor a suction pressure controller 212 may be provided, this controller including a bellows 213 connected by means of a pipe 214 to the inlet of the compressor. A lever 215 is biased by means of a spring 216 into engagement with the top of the bellows 213, and this lever carries a mercury switch 217. A high pressure controller 218 may also be provided for controlling the operation of the compressor. This controller may include a bellows 219 connected by means of a pipe 220 to the outlet of the compressor. An arm 221 is biased by means of an adjustable spring 222 into engagement with the bellows 219, this arm being pivoted at 223 and carrying a mercury switch 224 at one end thereof. The circuit through the motor 201 is as follows: from the line 210 through conductor 230, mercury switch 224 of the high pressure controller 218, conductor 231, mercury switch 217 of the suction pressure controller 212, conductor 232 through the motor 201 and conductor 233 to the line 209. It will now be apparent that the motor 201 will operate as long as the suction pressure is above a predetermined value and the discharge pressure is below a predetermined value. Should the suction pressure drop to a low enough value the switch 217 will be tilted in the opposite direction from that illustrated and interrupt the circuit to the motor 201. Should the discharge pressure reach a predetermined high value, the switch 224 will be tilted by the bellows 219 in the opposite direction from that illustrated and break the circuit to the motor 201.

For cooling the condenser 203 water may be supplied to the tank 240 housing the coil 203 by means of a pipe 241 controlled by the valve 242. The water may leave the condenser by means of a pipe 243. A motor 250 similar to the motor 25 of Figures 1 to 3 is connected by means of a pinion 251 to a rack 252 connected to the valve stem 253 whereupon the position of the valve is controlled in accordance with the operation of the motor 250. The motor 250 is controlled by the differential pressure controller 260 which may be similar to that of Figure 1 and may include bellows 261 and 262 connected by means of capillary tubes 263 and 264 to bulbs 265 and 266 mounted in intimate contact with the inlet pipe 241 and outlet pipe 243, respectively, the tubes, bulbs, and bellows being provided with a suitable volatile fill. The lever 267 is operated in accordance with variations in temperature differential at 241 and 243 to move the control arm 270 with respect to resistance 271 in the same manner as in Figure 1. Upon an increase in temperature differential the arm 270 is moved towards the right and upon a decrease in temperature differential the arm 270 is moved towards the left. The motor terminal 272 is connected by means of conductors 275 and 276 to the center tapped resistance 277 across which the arm 270 moves. The terminal 273 is connected by means of conductors 278 and 281 to the left end of resistance 271 and the terminal 274 is connected by means of conductors 280 and 279 to the right end of resistance 271. As the temperature differential at 241 and 243 increases the arm 270 is moved towards the right thus decreasing the resistance between the terminals 272 and 274 and causing the motor to move the valve towards open position an amount which is proportional to the increase in temperature differential.

The arm 221 carries a control arm 285 suitably insulated therefrom and forming the arm of a compensating potentiometer having a resistance 286. The arm 285 is connected by means of conductors 287, resistance 288, conductors 289 and 275 to the motor terminal 272. The right end of the resistance 286 is connected by means of conductors 290 and 278 to the motor terminal 273 and the opposite end of this resistance is connected by means of conductors 291 and 286 to the terminal 274 of the motor 250. As the pressure on the discharge side of the compressor 200 increases the bellows 219 will expand and cause the control arm 285 to move towards the left over resistance 286 which will decrease the resistance connected between the terminals 274 and 275 whereupon the valve 242 will be moved towards open position. By reason of the resistance 288 connected in the circuit to the arm 285 this arm will have less effect on the motor than the arm 270 and will have the effect of shifting the control range of the arm 270 as the discharge pressure of the compressor 200 varies in the same manner that the control range of the control potentiometer arm 74 of Figure 1 is shifted in accordance with the return air temperature.

It will accordingly be seen that with the system shown in this figure for a given discharge pressure on the compressor the temperature differential between the inlet 241 and the outlet 243 for the condenser cooling water will be effectively controlled by controlling the amount of water supplied to the condenser whereby wasting of cooling water is eliminated. As the discharge pressure on the compressor increases, a need for further cooling of the condenser is indicated and the control arm 285 is shifted towards the left thus shifting the control range of the arm 270 to the left to maintain a lower differential in temperature between the inlet pipe 241 and the outlet pipe 243 so that the increased cooling of the condenser which is required will be effected.

Figure 5:
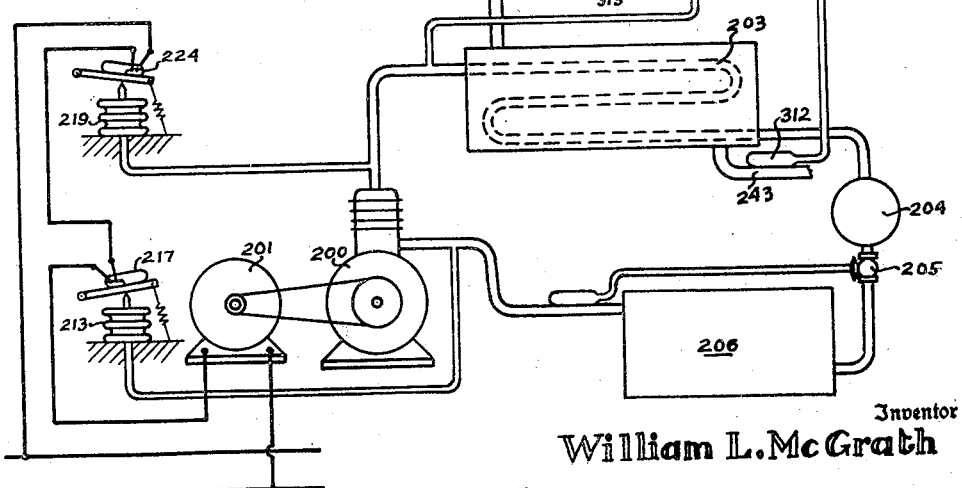
Figure 5 is a modification of the system shown in Figure 4 utilizing a self contained differential controller for the inlet valve.

Referring now to Figure 5 a refrigeration system generally similar to that of Figure 4 is illustrated, this system including the compressor 200, condenser 203, receiver 204, expansion valve 205, and evaporator 206. The circuit for controlling the operation of the compressor is shown as being identical to that of Figure 4 and further description is unnecessary thereof. It should be understood however that the control circuit for the compressor motor of Figures 4 and 5 may be modified in any of the manners well known in the art.

The control means for the valve 242 is shown to comprise a direct operating differential pressure controller 300 in place of the motor 250 controlled by the differential pressure controller 260 and the compensator 218 of Figure 4. The valve stem 253 of the valve 242 is connected to a lever 301 pivoted at 302 and biased by means of an adjustable spring 303 in a counter-clockwise direction. A bellows 304 connected by means of a capillary tube 305 to a bulb 306 mounted in intimate contact with the inlet pipe 241 which acts directly upon one side of the lever 301. A second bellows 310 is connected by means of a capillary tube 311 to the bulb 312 mounted in contact with the outlet pipe 243 and acts against the opposite side of the lever 301 in opposition with the bellows 304. It will be understood that both of these bellows, tubes, and bulbs will be filled with a suitable volatile fluid and it will be seen that the position of lever 301 will depend upon the relative pressures existing within the bellows 304 and 310 and therefore upon the temperature differential between the inlet pipe 241 and the outlet pipe 243. As the temperature differential increases bellows 310 will exert an increasingly greater net force on the lever 301 and cause clockwise movement thereof and consequent opening of the valve 242 whereupon an increased supply of water is permitted by the valve 242 to decrease the temperature differential at 241 and 243. Also acting on the lever 301 in opposition to the bellows 304 is a bellows 315 connected by means of a pipe 316 to the discharge side of the compressor 200. As the discharge pressure increases the bellows 315 will expand and for a given temperature differential at the inlet 241 and the outlet 243 an increase in the discharge pressure on the compressor will have the effect of moving the lever 301 in a clockwise direction thus further opening the valve 242.

It will be apparent that with this system the valve 242 is operated in accordance with the differential in temperatures at the inlet 241 and the outlet 243, this movement of the valve being compensated by the pressure on the discharge side of the compressor so as to maintain a lower temperature differential as the discharge pressure increases and conversely to maintain a higher differential as the discharge pressure decreases. This system is direct acting and eliminates the use of an electric motor as in Figures 1 to 4. It should be understood of course that the system illustrated in Figure 5 would also be applicable to a cooling system of the type shown in Figures 1 to 3, the bellows 315 being connected to a bulb responsive to return air temperature or space temperature if applied to a system as shown in Figure 1.

Figure 6:
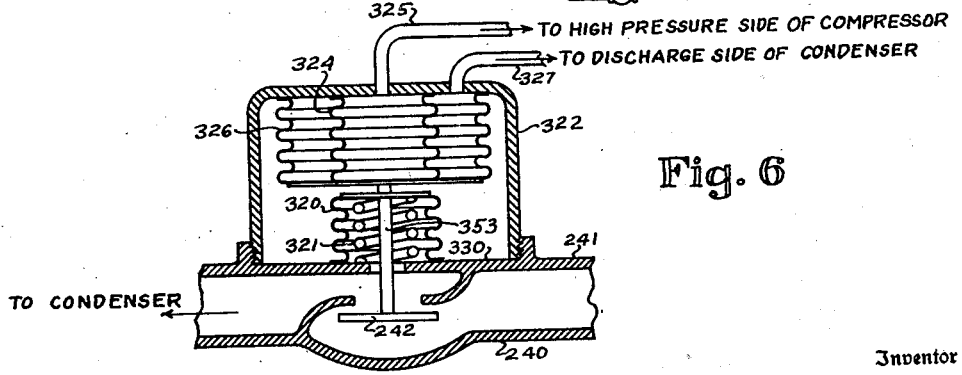
Figure 6 is a view in cross section of a self contained differential controller for operating the valve which controls the flow of water to the cooling coil.

Figure 6 shows another form of self contained unit wherein the operating mechanism may be built right into the valve mechanism. The inlet pipe to the condenser is illustrated at 241 and controlled by the valve 242. The valve stem 253 is connected to the upper wall of a small bellows 320, this valve being biased towards closed position by means of the spring 321. A cap 322 is suitably secured to the upper portion of the valve casing and forms an enclosed chamber which may be provided with a suitable volatile fill. The temperature of the water flowing past the valve 242 will be communicated to the volatile fill enclosed by cap 322 by the wall 330. Depending from the upper wall of the casing 322 is a small bellows 324 whose lower end is connected to the valve stem 253, the upper end of this bellows being sealed to the upper wall of the casing 322. A pipe 325 may connect this small bellows to the high pressure side of the compressor. Also sealed to the top of the casing 322 is a large bellows 326 which may be concentric with the bellows 324 and also suitably connected at its lower end to the valve stem 253. A capillary tube 327 may connect this large bellows to a bulb mounted on the discharge side of the condenser, this large bellows, tube, and bulb being filled with a suitable volatile fluid.

The bellows 326 will be expanded upon an increase in temperature at the discharge side of the condenser by reason of an increase in pressure of the volatile fill therein, and will be contracted by reason of an increase in pressure of the volatile fill surrounding this bellows upon an increase in temperature at the inlet side of the condenser. This bellows will accordingly cause the valve 242 to assume positions depending upon the differential in temperature at the inlet and the outlet side of the condenser to increase the supply of water when the differential increases to reduce the supply of water as the differential decreases. As the pressure on the high pressure side of the compressor increases, the force exerted by the bellows 324 will increase and its effect is added to the effect of the bellows 326 whereupon a lower differential in temperature will cause an equal opening of the valve. In other words, to open the valve a given amount it will take a smaller differential in temperature if the discharge pressure of the compressor is higher than is required when the discharge pressure is low.

It will therefore be seen that by using a self contained valve unit of the type shown in Figure 6 the supply of water may be controlled in the same manner as in Figure 5 without the use of an electric motor. It should be understood that this type of a valve operating mechanism could be applied to the systems illustrated in Figures 1 and 2 as well as to the systems of Figures 4 and 5. In such a case the bellows 324 would respond to the return air temperature whereby the valve position would be compensated in accordance with the return air temperature as in Figures 1 and 2.

Having described the preferred forms of my invention many modifications and many adaptations may become apparent to those skilled in the art and it should be understood that my invention is limited only by the scope of the appended claims.

I claim as my invention:

1. In a system of the class described, temperature changing means, a valve for controlling the flow of a temperature changing medium through said temperature changing means, a motor for controlling the position of said valve, an expansible device responsive to the temperature of the temperature changing medium entering said temperature changing means, an expansible device responsive to the temperature of the temperature changing medium leaving said temperature changing means, circuit controlling means for said motor controlled by the conjoint action of said expansible devices for positioning the valve in response to changes in temperature differential between the inlet and outlet of said temperature changing means, and means responsive to a condition which is a measure of a need for more or less temperature changing for varying the effect of said circuit controlling means on the motor.

2. In a system of the class described, temperature changing means, a valve for controlling the flow of a temperature changing medium through said temperature changing means, a motor for controlling the position of said valve, an expansible device responsive to the temperature of the temperature changing medium entering said temperature changing means, an expansible device responsive to the temperature of the temperature changing medium leaving said temperature changing means, circuit controlling means for said motor controlled by the conjoint action of said expansible devices for positioning the valve in response to changes in temperature differential between the inlet and outlet of said temperature changing means, and means responsive to the temperature of a space being controlled by said temperature changing means for varying the effect of said circuit controlling means on the motor.

3. In a system of the class described, a cooling unit, a valve for controlling the flow of a cooling medium through said unit, a motor for controlling the position of said valve, an expansible device responsive to the temperature of the cooling medium entering said cooling unit, an expansible device responsive to the temperature of the cooling medium leaving said unit, circuit controlling means for said motor controlled by the conjoint action of said expansible devices for positioning the valve in response to changes in temperature differential between the inlet and outlet of said unit, and means responsive to the attainment of a low predetermined temperature in a space being cooled by said unit for controlling said flow controlling means to prevent the flow of the cooling medium through said unit.

4. In a system of the class described, a cooling unit, a valve for controlling the flow of a cooling medium through said unit, a motor for controlling the position of said valve, an expansible device responsive to the temperature of the cooling medium entering said cooling unit, an expansible device responsive to the temperature of the cooling medium leaving said unit, circuit controlling means for said motor controlled by the conjoint action of said expansible devices for positioning the valve in response to changes in temperature differential between the inlet and outlet of said unit, and means responsive to the attainment of a predetermined low temperature in a space being cooled by said unit for causing said motor to rotate to a position in which said valve prevents the flow of cooling medium through said unit and rendering said circuit controlling means inoperative.

5. In a system of the class described, temperature changing means, a valve for controlling the flow of a temperature changing medium through said temperature changing means, an electric motor for controlling the operation of said valve, a device responsive to a condition which is a measure of the difference in temperatures of the medium at the inlet and outlet of said temperature changing means, means including circuit controlling means operated by said device for controlling the operation of said electric motor and valve, means responsive to a condition which is a measure of a need for more or less temperature changing, and means including circuit controlling means operated by said last mentioned means for also controlling the operation of said electric motor and valve.

6. In an air conditioning system, an air conditioning chamber, a cooling coil through which a cooling medium circulates, the cooling medium entering said coil at a fixed temperature, an electrically operated valve controlling the flow of cooling medium through said coil, means for circulating air through said air conditioning chamber to a space to be conditioned and back to said chamber, first variable resistance means responsive to the temperature of the cooling medium at the outlet of the cooling coil for controlling the rate of flow of the cooling medium through the coil, second variable resistance means responsive to the temperature of the air returning from said space, and means responsive to the values of said first and second variable resistance means for controlling the energization of the valve operator.

7. In a system of the class described, temperature changing means, a valve for controlling the flow of a temperature changing medium through said temperature changing means, an electric motor for controlling the position of said valve, a device responsive to the temperature of the temperature changing medium entering said temperature changing means, a device responsive to the temperature of the temperature changing medium leaving said temperature changing means, motor controlling means including variable resistance means controlled by the conjoint effects of said devices to position the valve in response to changes in temperature differential between the inlet and outlet of said temperature changing means, and means responsive to a condition which is a measure of a need for more or less temperature changing for varying the action of said motor controlling means.

8. In a system of the class described, a cooling unit, a valve for controlling the flow of a cooling medium through said unit, a motor for controlling the position of said valve, a first variable resistance means responsive to the temperature of the cooling medium entering said cooling unit, a second variable resistance means responsive to the temperature of the cooling medium leaving said unit, motor controlling means controlled by the conjoint effects of said variable resistance means to position the valve in response to changes in temperature differential between the inlet and outlet of said unit, and means responsive to the attainment of a low predetermined temperature in a space being cooled by said unit for controlling said valve to prevent the flow of the cooling medium through said unit.

9. In a system of the class described, a cooling unit, a valve for controlling the flow of a cooling medium through said unit, a motor for controlling the position of said valve, a device including electrical resistance means responsive to the temperature of the cooling medium entering said cooling unit, a device including electrical resistance means responsive to the temperature of the cooling medium leaving said unit, motor controlling means including an electrical circuit controlled by the conjoint action of said devices to position the valve in response to changes in temperature differential between the inlet and outlet of said unit, and means in said circuit responsive to the attainment of a predetermined low temperature in a space being cooled by said unit for causing said motor to rotate to a position in which said valve prevents the flow of cooling medium through said unit and rendering said previously named motor controlling means ineffective.

WILLIAM L. McGRATH.